United States Patent [19]

Kitazawa et al.

[11] Patent Number: 4,588,009
[45] Date of Patent: May 13, 1986

[54] PNEUMATIC TIRE FOR MOTORCYCLE HAVING AN EXCELLENT ABSORBABILITY TO EXTERNAL DISTURBANCES

[75] Inventors: Yoichi Kitazawa, Higashiyamato; Toshiharu Kikutsugi, Kodaira, both of Japan

[73] Assignee: Bridgestone Corporation, Tokyo, Japan

[21] Appl. No.: 646,544

[22] Filed: Sep. 4, 1984

[30] Foreign Application Priority Data

Sep. 9, 1983 [JP] Japan ................... 58-164940

[51] Int. Cl.$^4$ .................. B60C 11/04; B60C 11/00
[52] U.S. Cl. ...................... 152/209 R; 152/525
[58] Field of Search ............ 152/209 R, 330 R, 374, 152/353 R, 525

[56] References Cited

U.S. PATENT DOCUMENTS 4,319,619 3/1982 Kozima et al. ............... 152/374
4,349,061 9/1982 Hirakawa et al. ............ 152/209 R
4,388,960 6/1983 Wada et al. ................. 152/209 R

FOREIGN PATENT DOCUMENTS 56-79004 6/1981 Japan ..................... 152/209 R

OTHER PUBLICATIONS

Ambelang, "Compositional Variables Affecting Dynamic Properties of Tire Compounds", Journal of Elastomers & Plastics, vol. 9 (Oct. 1977) pp. 384-394.

Primary Examiner—Lois E. Boland
Attorney, Agent, or Firm—Sughrue, Mion, Zinn, Macpeak and Seas

[57] ABSTRACT

A pneumatic tire for motorcycle having an excellent absorbability to external disturbances is disclosed, which comprises a tread having a laminate structure inclusive of a base rubber having a storage modulus of 50-90 kg/cm$^2$ and a ratio of loss tangent to storage modulus of $2.5 \times 10^{-3} - 5 \times 10^{-3}$ and a cap rubber having a storage modulus at least equal to that of the base rubber.

6 Claims, 2 Drawing Figures

PNEUMATIC TIRE FOR MOTORCYCLE HAVING AN EXCELLENT ABSORBABILITY TO EXTERNAL DISTURBANCES

BACKGROUND OF THE INVENTION

1. Field of the Invention

This invention relates to a pneumatic tire for motorcycle, and more particularly to an improvement of a pneumatic rubber tire for motorcycle which can realize effective absorption and mitigation of external disturbances transferred from road surface during the running of the motorcycle.

2. Description of the Prior Art

In a motorcycle tire, there has hitherto been known an example where a rubber layer covering an outer periphery of a toroidal carcass is composed of a tread rubber for a crown portion of the carcass and a side rubber for a sidewall portion. Another example is that where the rubber layer is composed of a single rubber extending from the crown portion to the sidewall portion.

In the former example, rubber having excellent wear resistance, wet skid resistance and cornering stability is used as the tread rubber and rubber having an excellent flex resistance is used as the side rubber. On the other hand, the latter example uses rubber having such compromise properties that the properties required for the tread rubber and the side rubber are sacrificed to a certain extent. In any case, these tires do not exhibit these problem at an initial use stage, but the following troubles are caused as wear proceeds, i.e. on and after middle wearing stage:

(1) In the tire for front wheel, a so-called shimmy phenomenon is produced to cause vibration of handle bars; and (2) In the tire for rear wheel, a so-called wobble phenomenon is produced to cause vibration of a vehicle body.

As a result of detail investigations on the cause of these phenomena, it has been confirmed that the above phenomena result from the fact that as the rubber layer of the tread is worn and is on and after the middle wearing stage, the shearing rigidity of the tread in a direction parallel to the rotational axis of tire rises due to the wearing and finally the function of the tread for absorbing and mitigating changes transferred from road surface or external disturbances is degraded.

Apart from the investigation on the cause, it has hitherto been attempted to make a rubber gauge between the adjacent plies of the carcass thicker as a countermeasure on the above problem. By this countermeasure, the trouble is solved to a certain extent in the straight running of the motorcycle, but the trouble is still left in cornering, so that the above countermeasure can hardly be said to provide sufficient solution on the troubles.

Recently, the motorcycles have remarkable trends to make the size larger and to use at higher speed, so that the aforementioned troubles actually come into open as a serious problem in view of the safety.

SUMMARY OF THE INVENTION

It is, therefore, an object of the invention to drastically and effectively solve the aforementioned problems in the tread of the motorcycle tire.

According to the invention, there is the provision of a pneumatic tire for motorcycles having an excellent absorbability to external disturbances and comprising a tread, a pair of sidewalls extending from both side ends of the tread and a toroidal carcass reinforcing them;

said tread having a laminate structure inclusive of a base rubber having a storage modulus (E') of 50–90 kg/cm$^2$ and a ratio of loss tangent to storage modulus (tan $\delta$/E') of $2.5 \times 10^{-3} - 5 \times 10^{-3}$ and a cap rubber having a storage modulus at least equal to that of the base rubber, preferably higher by 1.3–2.5 times than that of the base rubber; and said base and cap rubbers being arranged as one body along the carcass between the sidewalls up to positions corresponding to the maximum width of the tire.

BRIEF DESCRIPTION OF THE DRAWING

The invention will be described in detail with reference to the accompanying drawing, wherein.

DETAILED DESCRIPTION OF THE INVENTION

Figure 1:
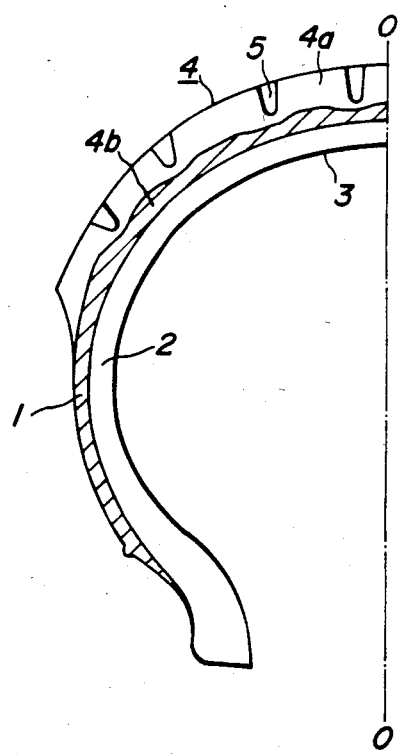
FIG. 1 is a schematically half section view of an embodiment of the pneumatic tire for motorcycles according to the invention.

In general, the reinforcing structure in the tire of this type is well-known and the detail thereof is omitted from the drawing. As shown in FIG. 1, a toroidal carcass 2 composed of plural plies each containing textile cords is usually extended between a pair of bead cores each located near the inner peripheral end of the sidewall 1 in the radial direction of the tire as a tire reinforcement. When the carcass 2 has a bias structure of crossing cords of the plies with each other, the cord angle of each ply of the carcass is 28°–45° with respect to the plane inclusive of the mid-circumference O—O of the tire, and in some cases a breaker (not shown) composed of one or two cord layers containing the same kind of cords arranged at the same cord angle as in the carcass 2 is superimposed about a crown portion 3 of the carcass 2. On the other hand, when the carcass 2 has a so-called belted structure, the same cords as used in the bias structure are used as a carcass ply and particularly a belt composed of plural cord layers each containing inextensible cords such as steel cords, aramid fiber cords or the like is used instead of the breaker, wherein the cord angles of the carcass and the belt are 70°–90° and not more than 30° with respect to the plane inclusive of the mid-circumference O—O, respectively.

A tread 4 is located on the crown portion 3 of the carcass 2 to extend over the maximum width of the carcass 2 as a whole, and the total gauge of the tread 4 is substantially uniform over a region extending from the mid-circumference O—O to each side end of the tread 4.

According to the invention, the tread 4 comprises a cap rubber 4a located outward in the radial direction of the tire and a base rubber 4b located near the carcass 2 in the radial direction and having properties different from those of the cap rubber 4a. Moreover, a third rubber layer (not shown) may be arranged in the tread 4 without damaging the object of the invention.

The base rubber 4b is extended over a major part of the tread 4 about the mid-circumference O—O and is usually desirable to extend over a whole width of the tread 4.

In view of the vibration damping effect, it is more preferable that an outer rubber for the sidewall 1 is formed by an extension of the base rubber 4b as shown in FIG. 1.

Figure 2:
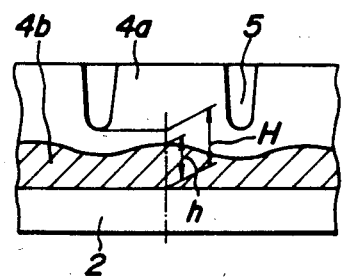
FIG. 2 is a schematic detail view of a main part of the tire according to the invention.

The base rubber 4b may be made slightly thin at a position corresponding to a tread groove 5 as shown in FIG. 1 in addition to the uniform gauge. In this case, the maximum gauge h of the base rubber 4b (see FIG. 2) is within a range of 0.2-1.0, preferably 0.3-0.6 times a skid base gauge H or a distance between the bottom of the tread groove 5 and the outer surface of the carcass 2. When the ratio h/H is less than 0.2, the absorbability to external disturbances can not be expected satisfactorily, while when the ratio exceeds 1.0, the shearing rigidity excessively lowers in relation to rubber properties as mentioned later, which frequently and adversely affects the cornering stability, particularly camber property.

On the assumption that the tread 4 has fundamentally a so-called cap and base structure as mentioned above, according to the invention, it is required as properties of the base rubber 4b that the storage modulus (E') is 50–90 kg/cm$^2$, preferably 60–90 kg/cm$^2$, and the ratio of loss tangent to storage modulus (tan $\delta$/E') is $2.5 \times 10^{-3} - 5.0 \times 10^{-3}$, preferably $3.0 \times 10^{-3} - 4.0 \times 10^{-3}$. In this case, the storage modulus E' of the base rubber 4b is necessary to be equal to or smaller than that of the cap rubber 4a.

When the storage modulus E' of the base rubber 4b is less than 50 kg/cm$^2$, the shearing rigidity of the base rubber 4b excessively lowers to cause uncomfortable feeling on the cornering stability, while when E' exceeds 90 kg/cm$^2$, the absorbability and mitigability to external disturbances transferred from road surface are degraded. Furthermore, when the ratio of tan $\delta$/E' is less than $2.5 \times 10^{-3}$, there is caused a problem in the absorbability and mitigability to external disturbances. When the ratio exceeds $5.0 \times 10^3$, the heat build-up during the running becomes excessive and particularly the high-speed durability lowers undesirably.

As to the properties of the cap rubber 4a, there is particularly no restriction except that the storage modulus E' is equal to or larger than that of the base rubber 4b. If the storage modulus E' of the cap rubber 4a is smaller than that of the base rubber 4b, the shearing rigidity required for the tread 4 is short of, so that it is unsuitable in the cornering stability.

The measurement of the above rubber properties is made by using a viscoelastic spectrometer made by Iwamoto Seisakusho, wherein the storage modulus E' and loss tangent tan $\delta$ at 30° C. are measured with respect to a rubber specimen having a size of 20 mm length $\times$ 5 mm width $\times$ 2 mm thickness under such conditions that an initial strain is 5%, an amplitude is 1%, a frequency is 50 Hz and a temperature range is $-10°$ C. $\sim +50°$ C., respectively.

The invention will be described with respect to the following example.

A front tire having a size of 100/90-18 and a rear tire having a size of 120/90-18 were mounted on front and rear wheels of a motorcycle, respectively, wherein each of these tires had a carcass of bias structure composed of four cord plies each containing as usual nylon cords. In the tire according to the invention, the tread 4 had a cap and base structure as shown in the following Table 1, while a tire having a tread composed only of the same rubber as in the cap rubber according to the invention was provided as a conventional tire for the comparison.

TABLE 1

| Kind of tire | | Invention tire | Conventional tire |
|---|---|---|---|
| Cap rubber 4a | E' (kg/cm$^2$) | 110 | 110 |
| | tan $\delta$/E' | $3.5 \times 10^{-3}$ | $3.5 \times 10^{-3}$ |
| Base rubber 4b | gauge ratio h/H | 0.42 | |
| | E' (kg/cm$^2$) | 70 | |
| | tan $\delta$/E' | $3.5 \times 10^{-3}$ | |

Note
In the invention tire, the width of the base rubber 4b was equal to that of the cap rubber 4a.

The following tests were made with respect to these tires to obtain results as shown in the following Table 2.

TEST METHODS (1) Resistance to shimmying

The motorcycle body was run by inertia on a straight road from a speed of 100 km/hr without holding on, during which the occurrence of vibration around the steering axis about the front wheel was evaluated by the feeling of a driver. In this case, the internal pressure was 2.0 kg/cm$^2$ in the front tire and 2.2 kg/cm$^2$ in the rear tire.

(2) Resistance to wobbling

The motorcycle was actually run on a circuit course of 4.3 km at a maximum speed of 200 km/hr, during which the cornering stability against external disturbances was evaluated by the feeling of a driver. The internal pressure was the same as in the above item (1).

(3) High-speed durability

The rear tire (size: 120/90-18) subjected to an internal pressure of 3.0 kg/cm$^2$ was placed on a smooth steel drum of 1.6 m in diameter under a load of 300 kg and then run at a speed of 170 km/hr. After the tire was run at the same speed without trouble for 10 minutes, the running was continued for 10 minutes by raising the running speed at a rate of 10 km/hr until the trouble occurred.

TABLE 2

| Kind of tire | | | Conventional tire | Invention tire |
|---|---|---|---|---|
| Actual running test | Shimmy | at new tire | no trouble | no trouble |
| | | at 50% wearing stage | trouble slightly occurred | no trouble |
| | whobble | at new tire | trouble slightly occurred | no trouble |
| | | at 50% wearing stage | trouble fairly occurred | no trouble |
| Test for high-speed durability | | | no trouble | no trouble |

As apparent from the results of the above comparison test, the invention has a remarkable effect on vibrations such as shimmy, wobble and the like which are inevitably produced in the conventional tire on and after the middle wearing stage. Although the tire according to the invention is most effective to be applied to front and rear wheels of the motorcycle, even if it is applied only to the rear wheel and the conventional tire is applied to the front wheel, the cornering stability can be improved.

What is claimed is:

1. A pneumatic tire for motorcycles having an excellent absorbability to external disturbances and comprising a tread, a pair of sidewalls extending from both side ends of the tread and a toroidal carcass reinforcing the tread and sidewalls;

said tread having a laminate structure inclusive of a base rubber having a storage modulus (E') of 50-90 kg/cm$^2$ and a ratio of loss tangent to storage modulus (tan δ/E') of $2.5 \times 10^{-3} \sim 5.0 \times 10^{-3}$ and a cap rubber having a storage modulus higher than that of said base rubber; and said base and cap rubbers being arranged as one body along the carcass between the sidewalls up to positions corresponding to the maximum width of the tire.

2. A pneumatic tire for motorcycles having an excellent absorbability to external disturbances and comprising a tread, a pair of sidewalls extending from both side ends of the tread and a toroidal carcass reinforcing the tread and sidewalls;

said tread having a laminate structure inclusive of a base rubber having a storage modulus (E') of 50-90 kg/cm$^2$ and a ratio of loss tangent to storage modulus (tan δ/E') of $2.5 \times 10^{-3} \sim 5.0 \times 10^{-3}$ and a cap rubber having a storage modulus higher by 1.3-2.5 times than that of said base rubber; and said base and cap rubbers being arranged as one body along the carcass between the sidewalls up to positions corresponding to the maximum width of the tire.

3. A pneumatic tire for motorcycles according to claim 2, wherein said base rubber has a storage modulus of 60-90 kg/cm$^2$ and a ratio of loss tangent to storage modulus of $3.0 \times 10^{-3} - 4.0 \times 10^{-3}$.

4. A pneumatic tire for motorcycles according to claim 2, wherein said base rubber is extended over a whole width of said tread.

5. A pneumatic tire for motorcycles according to claim 2, wherein said base rubber is extended beyond said tread to form an outer rubber for said sidewall.

6. A pneumatic tire for motorcycles according to claim 2, wherein said base rubber has a maximum gauge corresponding to 0.2-1.0 times a distance between a bottom of a tread groove and an outer surface of the carcass.

* * * * *